(12) United States Patent
Hsu

(10) Patent No.: US 6,914,777 B2
(45) Date of Patent: Jul. 5, 2005

(54) MODULARIZED UNIVERSAL JACKET FOR PERSONAL DIGITAL ASSISTANTS

(75) Inventor: Gary Hsu, Taipei Hsien (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/660,617

(22) Filed: Sep. 12, 2003

(65) Prior Publication Data

US 2004/0066619 A1 Apr. 8, 2004

(30) Foreign Application Priority Data

Oct. 8, 2002 (TW) ...................................... 91215989 U

(51) Int. Cl.⁷ ................................................. G06F 1/16
(52) U.S. Cl. ...................... 361/683; 361/686; 710/303; 455/556.2
(58) Field of Search ................................. 361/680–683, 361/686, 728–731; 710/303, 304; 455/556.1, 556.2; D14/345, 346; 439/44; 429/96–100, 123

(56) References Cited

U.S. PATENT DOCUMENTS 5,768,106 A * 6/1998 Ichimura .................... 361/785
6,570,775 B2 * 5/2003 Lai ............................. 361/801
2002/0078248 A1 * 6/2002 Janik et al. ................. 709/252
2003/0016487 A1 * 1/2003 Tung-Chieh et al. ........ 361/679
2003/0100275 A1 * 5/2003 Hsu et al. ..................... 455/90
2003/0116631 A1 * 6/2003 Salvato et al. ......... 235/472.01
2004/0066611 A1 * 4/2004 Wu ............................. 361/680

* cited by examiner

*Primary Examiner*—Lynn Feild
*Assistant Examiner*—Anthony Q. Edwards
(74) *Attorney, Agent, or Firm*—Birch, Stewart, Kolasch & Birch, LLP

(57) ABSTRACT

A modularized universal jacket for a personal digital assistant is described. The jacket includes a housing consisting of an upper shell and a lower shell for enclosing to define a first section, a second section and a third section, and three modules respectively mounted in the three sections and electrically connected to each other and an adapting board coupled on the housing. Furthermore, each of the modules can be replaced according to instructions, or predetermined or upgrade needs, and the modules can be a battery module, a wireless module and a main circuit board module, respectively.

14 Claims, 9 Drawing Sheets

MODULARIZED UNIVERSAL JACKET FOR PERSONAL DIGITAL ASSISTANTS

This nonprovisional application claims priority under 35 U.S.C. §119(a) on Patent Application No. 091215989 filed in TAIWAN on Oct. 8, 2002, which is herein incorporated by reference.

BACKGROUND OF THE INVENTION

1. Field of the Invention

The present invention relates to a jacket for a personal digital assistant (PDA) and, more particularly, to a modularized universal jacket capable of matching various kinds of PDAs to facilitate use.

2. Description of the Related Art

A personal digital assistant (PDA) is a new kind of portable device. Its volume is much smaller than that of a notebook computer so that it can be placed on a palm and operated. Recently, the PDAs have been much valued, and more and more people start to use them.

A PDA has many functions. For instance, it can store thousands of pieces of personal information including address book, schedules, agenda, memos, and so on. In addition to the above basic function, most PDAs can link with a computer by a jacket that offers functions, such as charging, external power supply, computer linking, wireless communication or data transmission between electronic cards.

At present, the convention jacket designed and manufactured must match up the appearance and layout of the specific PDA, hence when a new kind of PDA is marketed, a new jacket also must be simultaneously available due to the short product life of the PDA. It costs high to redesign a new jacket and reorder a new mold for a newly developed PDA.

Furthermore, the convention jacket fails to match all various kinds of PDAs to facilitate use due to the non-replaceable components (or modules). In light of the foregoing, there is a need to provide a modularized universal jacket modularizing commonly used components (or modules) of various kinds of jackets for achieving a function of the replaceable components (or modules).

Additionally, the convention jackets in different factories still have different connectors and placements for the various kinds of PDAs. The present invention aims to resolve the above problems in the prior art.

SUMMARY OF THE INVENTION

Accordingly, the object of the invention is to provide a modularized universal jacket for palm-sized computer devices.

To achieve the purposes of the present invention, as embodied and broadly described herein, the present invention provides a modularized universal jacket for a personal digital assistant, which includes a housing consisting of an upper shell and a lower shell for enclosing to define a first section, a second section and a third section in an interior space thereof. A module set has three modules respectively mounted in the three sections and electrically connected to each other. An adapting board is coupled on the housing. Each of the modules is replaced according to instructions, or predetermined or upgrade needs. The modules are a battery module, a wireless module and a main circuit board module, respectively.

BRIEF DESCRIPTION OF THE DRAWINGS

Other objects, advantages and novel features of the invention will become more clearly and readily apparent from the following detailed description when taken in conjunction with the accompanying drawings.

DETAILED DESCRIPTION OF THE PREFERRED EMBODIMENTS

Figure 1:
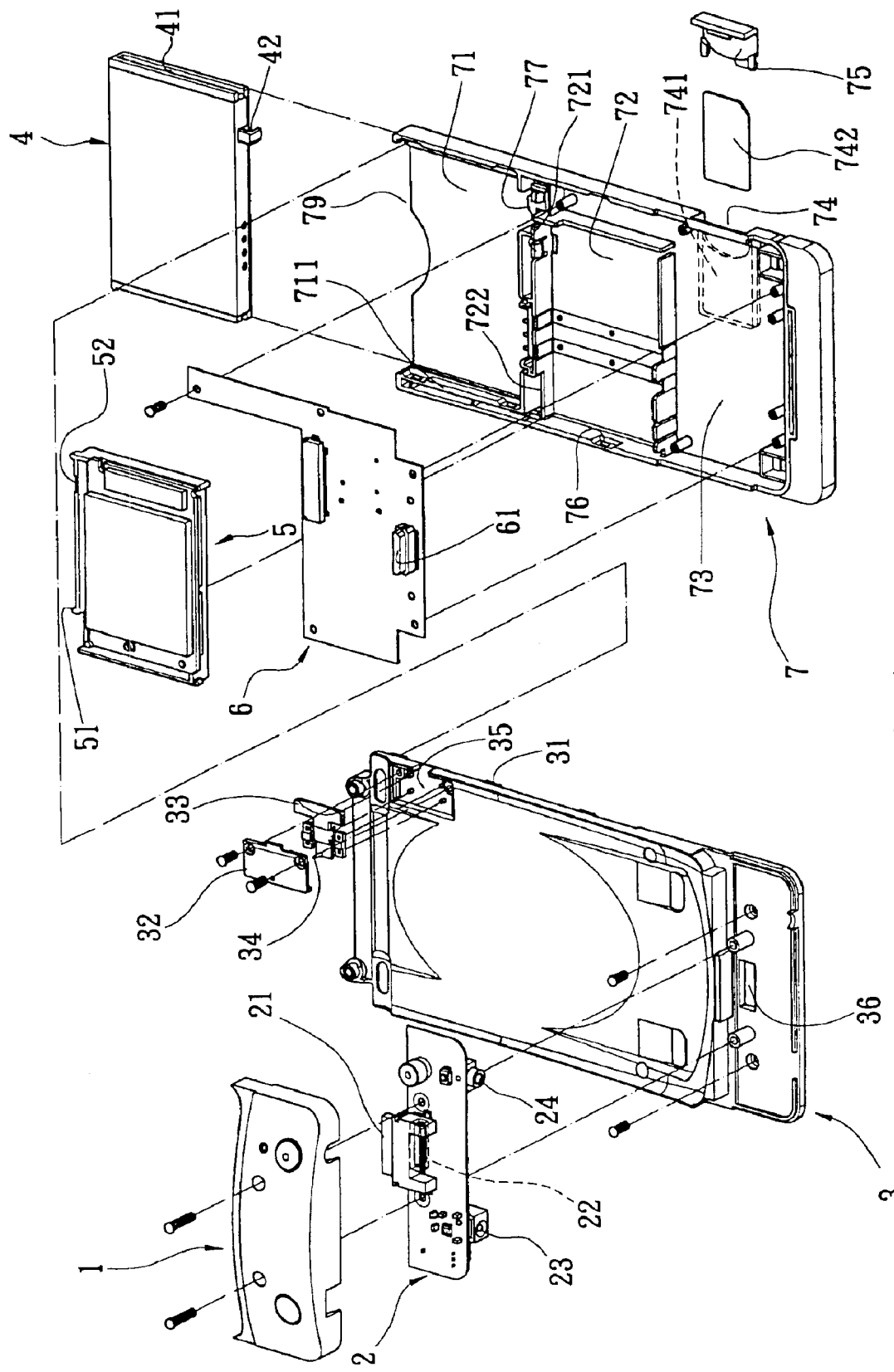
FIG. 1 is an exploded diagram illustrating the present invention.

Referring to FIGS. 1 to 4, a modularized universal jacket for a personal digital assistant (PDA) in accordance with the present invention comprises adapting means including a cover body 1 and an adapting board 2, a housing consisting of an upper shell 3 and a lower shell 7, a module set including a battery module 4, a wireless module 5 and a main circuit board module 6.

Referring to FIG. 1, the adapting board 2 is a circuit board of a plate body type. The adapting board 2 has a receptacle connector 21 and the other electronic components arranged on its top. The adapting board 2 provides an adapter connector 22, a power socket 23, a jack 24 and other electronic components at its bottom. The above electronic components respectively situated on the top and bottom of the adapting board 2 are electrically connected to a board body of the adapting board 2.

Figure 2:
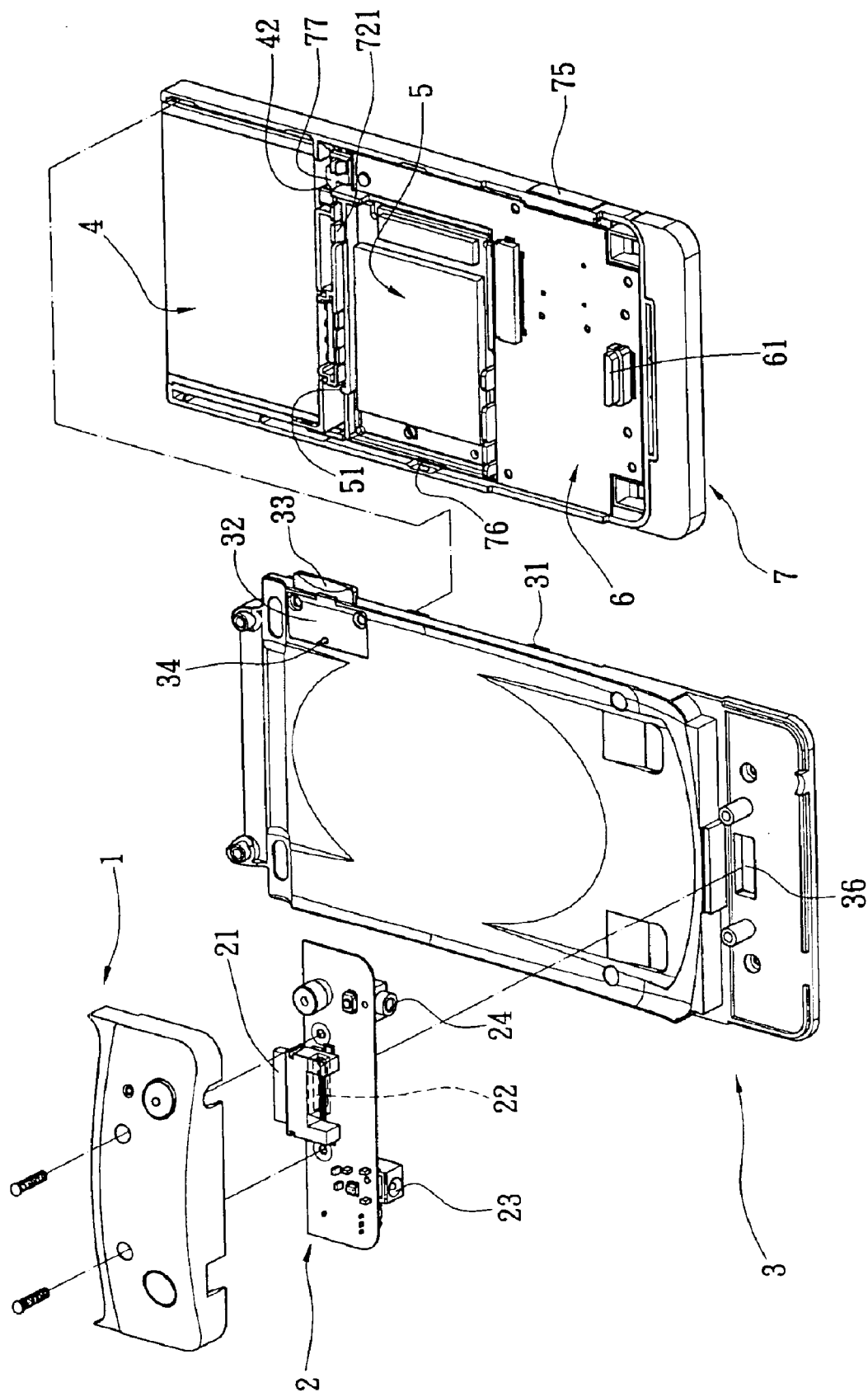
FIG. 2 is an exploded diagram illustrating the present invention.
Figure 5:
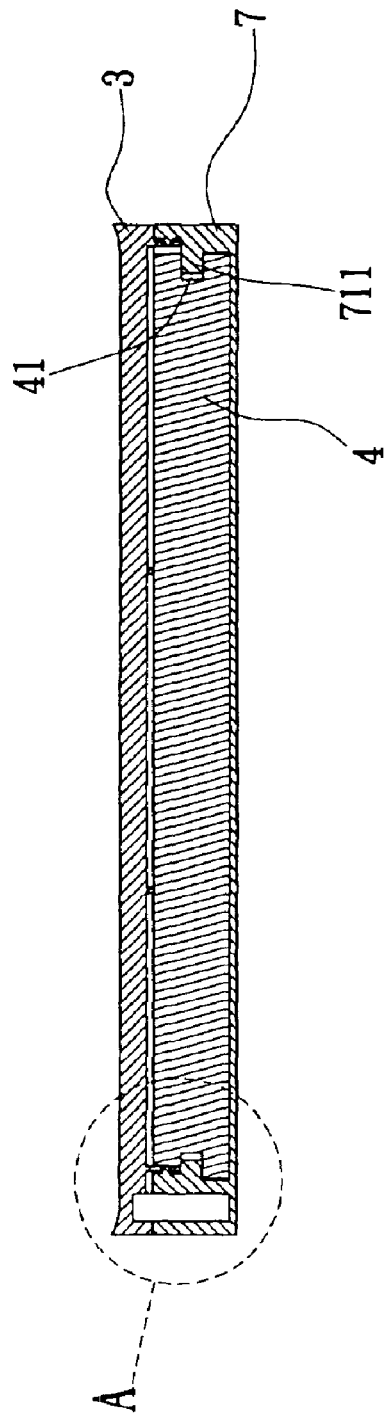
FIG. 5 is a cross-sectional view along line 5—5 of FIG. 4 according to this invention.
Figure 5A:
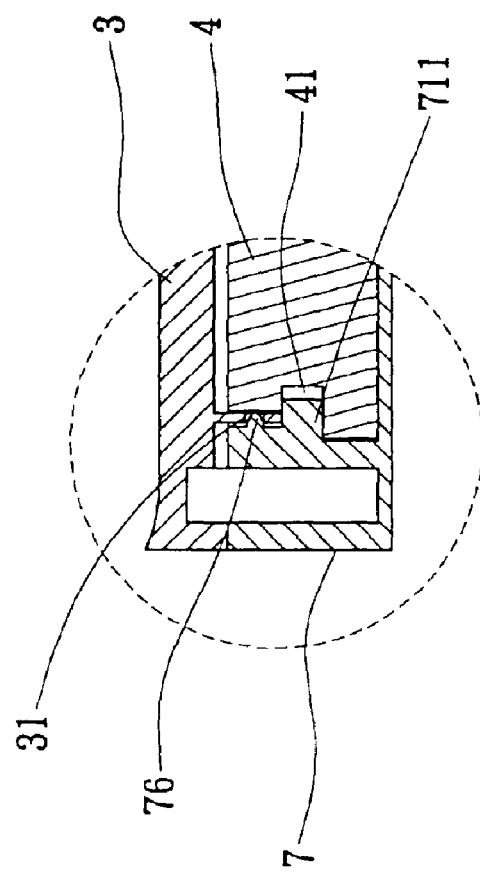
FIG. 5A is an enlarged view of FIG. 5.

An aperture 36 is formed on the upper shell 3 of the housing. At the periphery of the bottom side of the upper shell 3 of the housing, a plurality of wedging slots 31 are distributed, as shown in FIGS. 1 and 5A. A fillister 35 used to accommodate a seesawing plate 33 is provided on the upper shell 3 of the housing. A supporting needle 34 is disposed at one end of the seesawing plate 33. The seesawing plate 33 is placed in the fillister 35. A cover plate 32 is placed on the seesawing plate 33. As shown in FIG. 2, the supporting needle 34 at one end of the seesawing plate 33 protrudes from one hole of the cover plate 32. The other end of the seesawing plate 33 protrudes from a side of the upper shell 3 of the housing.

The battery module 4 can be any type of battery. The battery module 4 has four sides, two of which have symmetric sliding slots 41. One of the other two sides of the battery module 4 has a recess 42.

The wireless module 5 can obey any protocol such as Bluetooth, IEEE802.11b, GSM, GPRS, CDMA, PHS, 3G or the like and the combination. The wireless module 5 comprises a protrusion 51 and a recess 52.

The main circuit board module 6 comprises an adapter connector 61, which is connected to the corresponding adapter connector 22 of the adapting board 2. The lower shell 7 of the housing has an opening 79. At the inner periphery of the lower shell 7 has a wedging protrusion 76 corresponding to the wedging slot 31. A first, second and third sections 71, 72 and 73 are provided on the lower shell 7. The first section 71 communicates with the opening 79. The first section 71 has symmetric guiding tracks 711 at its two sides for guiding the battery module 4 as shown in FIG. 2, FIG. 5, and FIG. 5A. A movable wedge 77 is disposed at an inner periphery of the first section 71 corresponding to the recess 42 of the battery module 4. The third section 73 is used to accommodate the above main circuit board module 6. A slot 74 is provided in the back of the lower shell 7 corresponding to the third section 73. A card connector 741 is provided in the slot 74. In use, an electronic card 742 is inserted into the slot 74 and is electrically connected to the card connector 741. The slot 74 is covered by a cover 75. The second section 72 between the first and second sections is used to accommodate the above wireless module 5. A recess 722 is disposed in the inner periphery of the second section 72 corresponding to the protrusion 51 of the wireless module 5. A protrusion 721 is disposed in the inner periphery of the second section 72 corresponding to the recess 52 of the wireless module 5.

Figure 6:
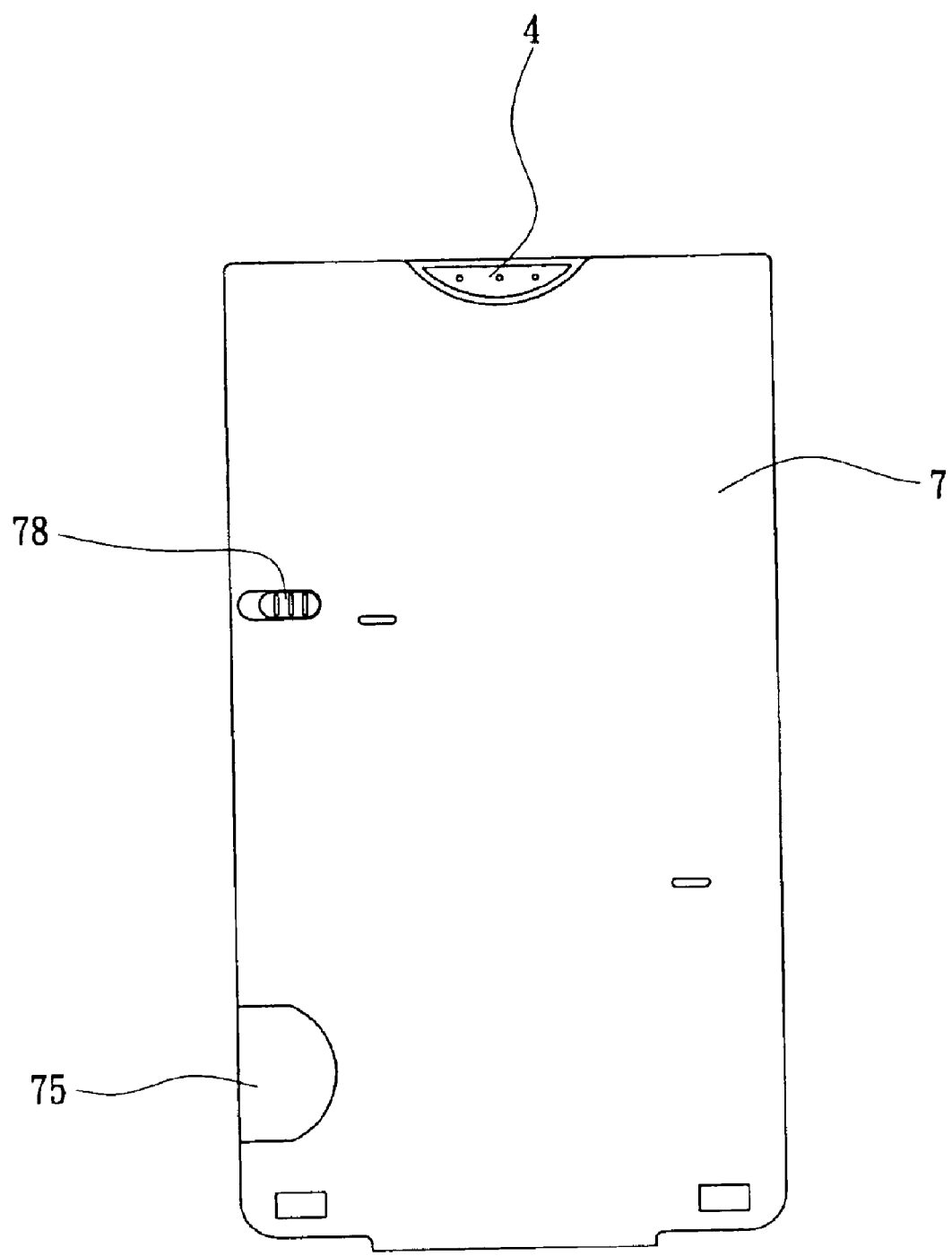
FIG. 6 is a backside view of the present invention.
Figure 7:
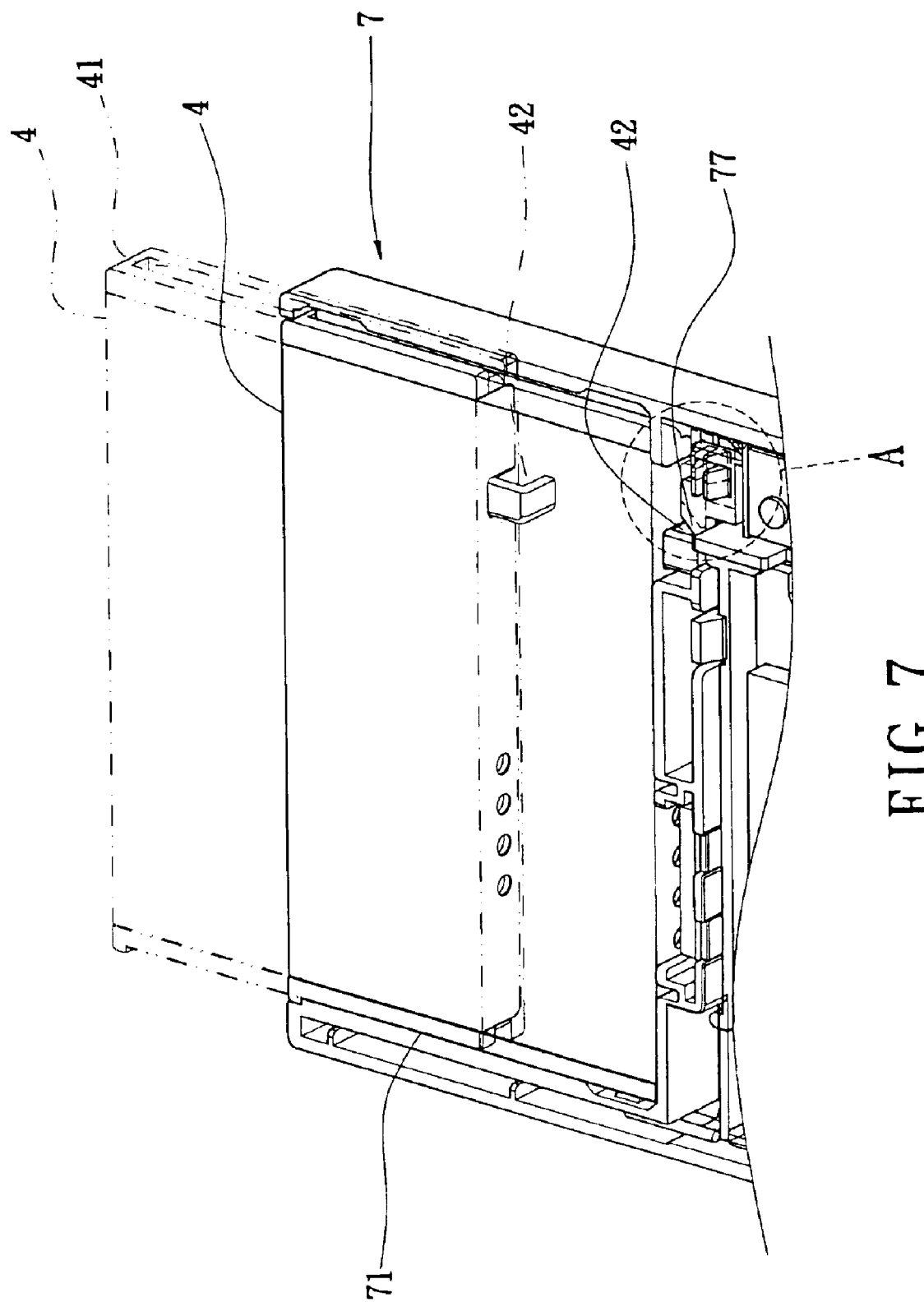
FIG. 7 illustrates the installation of the battery module according to this invention.
Figure 7A:
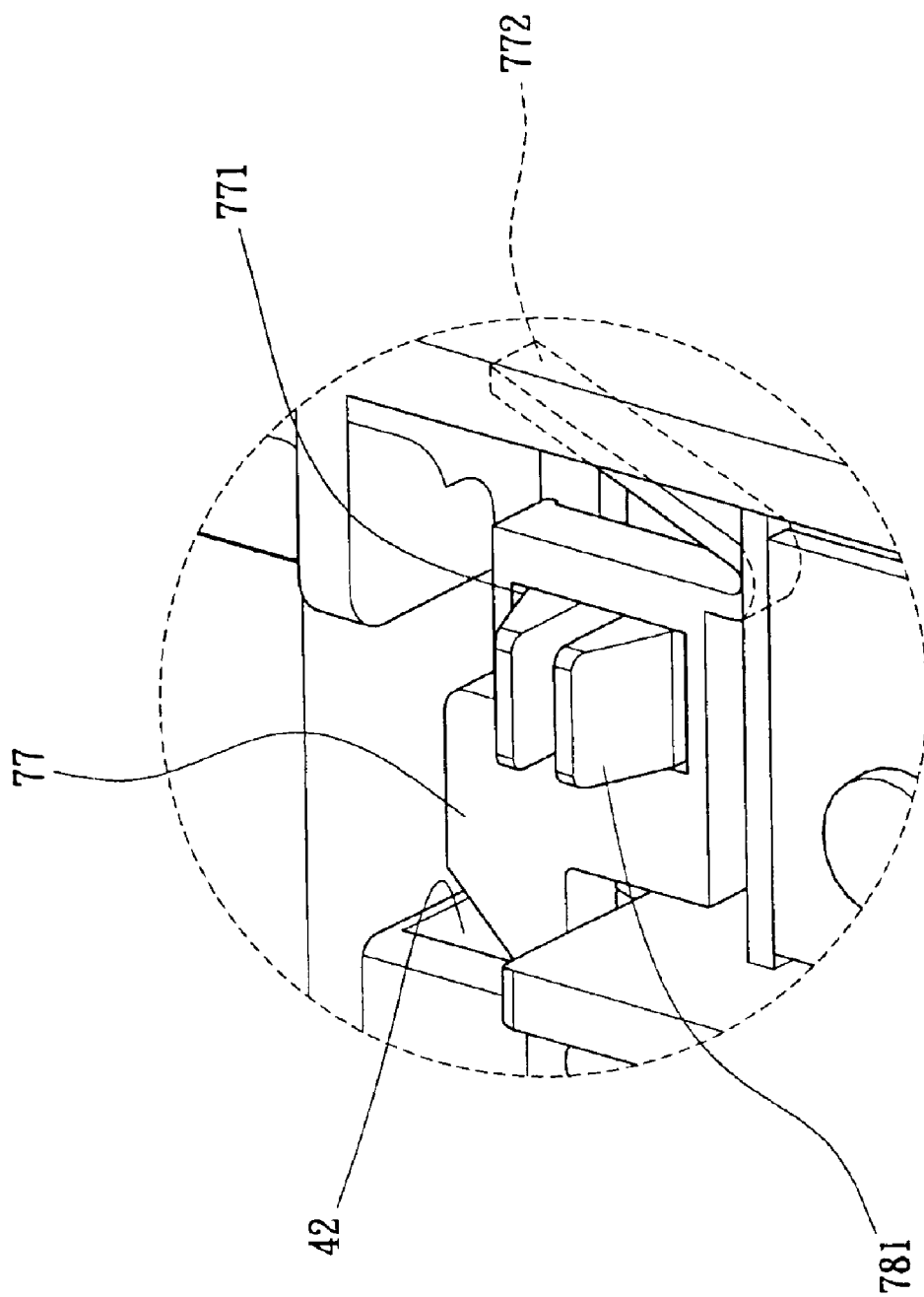
FIG. 7A is an enlarged view of FIG. 7.

Referring to FIG. 6, FIG. 7 and FIG. 7A, the above movable wedge 77 is connected to a switch 78 (best seen in FIG. 6) located on the back of the lower shell 7. The switch 78 has a pair of claws 781 penetrating through the lower shell 7. The pair of claws 781 further penetrates through the apertures 771 on the movable wedge 77, whereby the switch 78 and the movable wedge 77 are shifted synchronously. The movable wedge 77 comprises a flexible arm 772 abutting against the inner periphery of the above lower shell 7. The flexible arm 772 provides resilient force when the movable wedge 77 is shifted.

Referring to FIG. 1 and FIG. 2, the main circuit board module 6 is mounted in the third section 73 of the lower shell 7 by means of a plurality of screws. The card connector 741 is located in the slot 74. An electronic card is inserted in or pulled out from the card connector 741. A cover 75 is provided to cover the slot 74. The wireless module 5 is mounted in the second section 72 through the protrusion 51 buckled to the corresponding recess 722 and the corresponding protrusion 721 buckled to the recess 52. As shown in FIG. 5, the battery module 4 is guided into the first section 71 of the lower shell 7 of the housing through the guiding tracks 711 and corresponding sliding slots 41 of the battery module 4. As shown in FIG. 7 and FIG. 7A, when the battery module 4 is pushed into the end, the movable wedge 77 buckles to the recess 42 of the battery module 4, thereby fixing the battery module 4 in the first section 71. The battery module 4, the wireless module 5 and the card connector 741 are electrically connected to the main circuit board module 6.

Figure 3:
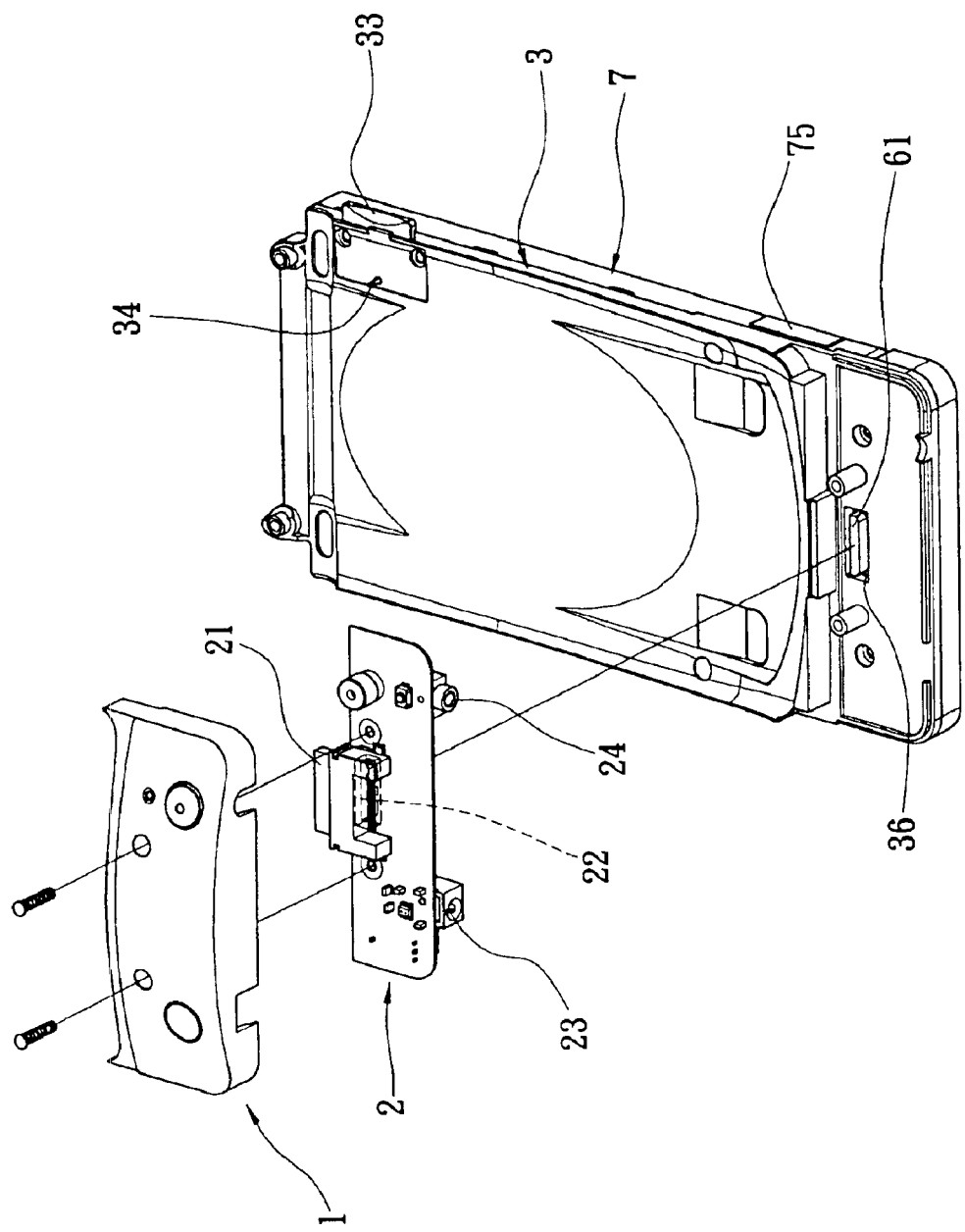
FIG. 3 is an exploded diagram illustrating the present invention.
Figure 4:
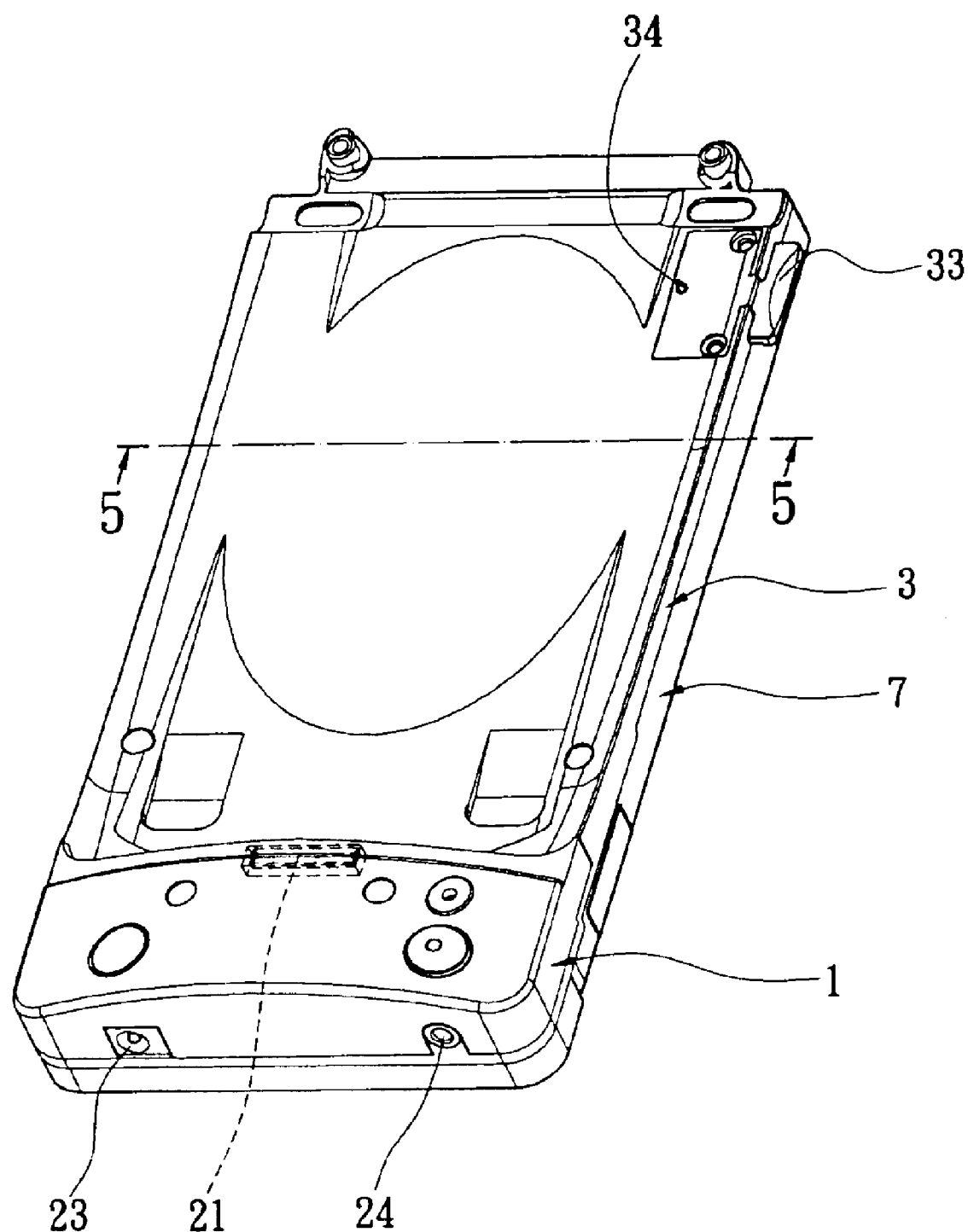
FIG. 4 is an assembly diagram illustrating the essential part of the present invention.
Figure 8:
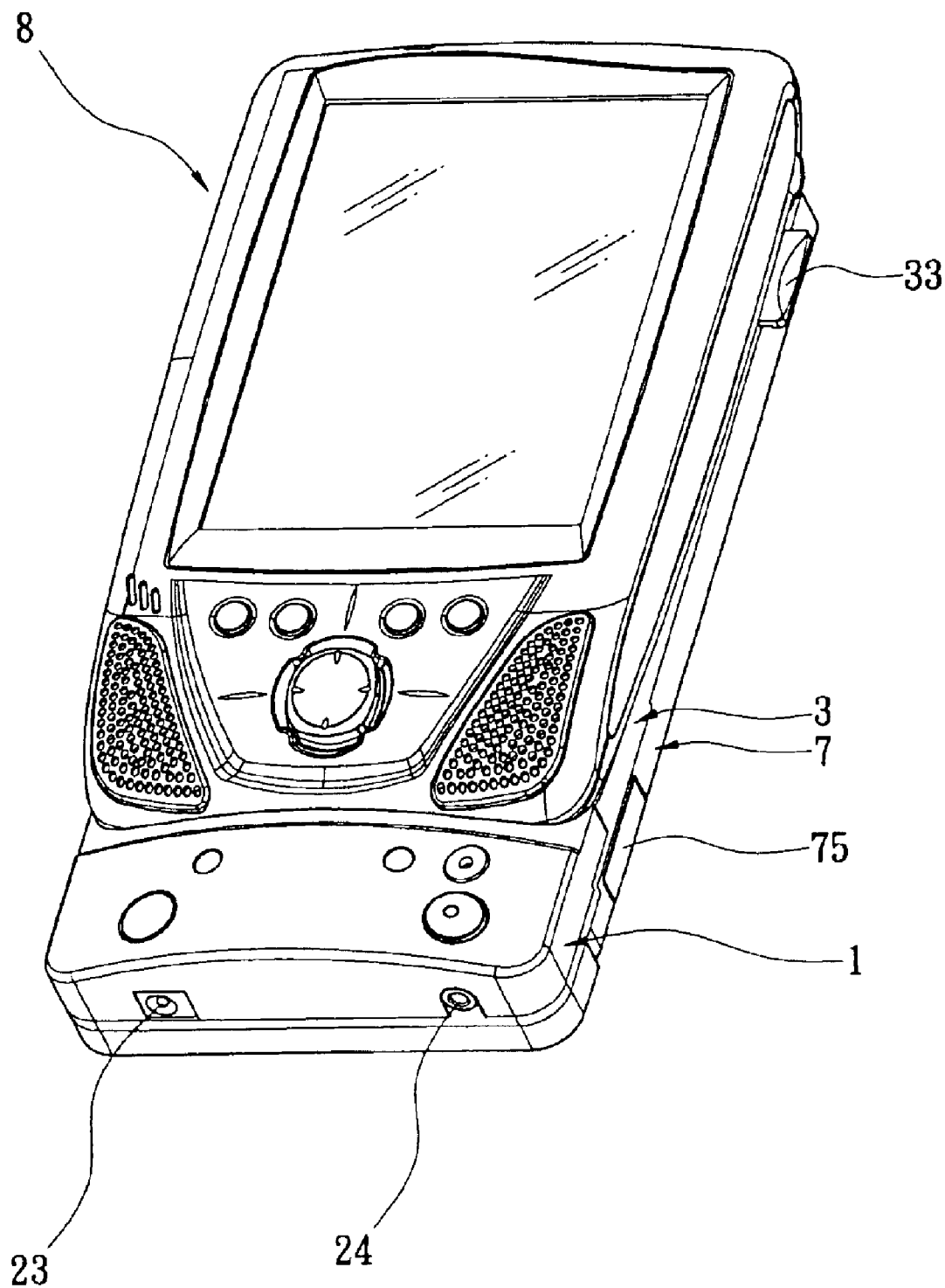
FIG. 8 is the present invention in connection with the PDA.

Referring to FIG. 1 to FIG. 3, the upper shell 3 of the housing with the seesawing plate 33 thereon is joined together with the lower shell 7 through the wedging slots 31 distributed at the inner periphery of the upper shell 3 and the corresponding wedging protrusions 76 (as best seen in FIG. 5 and FIG. 5A). The upper shell 3 and the lower shell 7 join together to form an enclosing housing. The adapter connector 61 of the main circuit board module 6 is exposed by the aperture 36 of the upper shell 3, as shown in FIGS. 2 and 3, such that the adapter connector 22 of the adapting board 2 is able to electrically connect to the adapter connector 61 of the main circuit board module 6 when the adapting board 2 is installed on the upper shell 3. The adapting board 2 and the cover body 1 are together mounted on the upper shell 3 by means of a plurality of screws, as shown in FIG. 4. The jacket shown in FIG. 4 is suitable for a PDA 8 as shown in FIG. 8. The PDA connector (not shown) is electrically connected to the receptacle connector 21 (shown in FIG. 4) to activate various functions of the jacket of this invention. As shown in FIG. 4 and FIG. 8, when the seesawing plate 33 is adjusted, the support needle 34 inserts into the corresponding reset hole (not shown) of the PDA 8 to reset the PDA 8.

In light of the foregoing jacket structure of the present invention, it is advantageous to use the present invention because the lower shell 7 has first, second and third sections 71–73. Any type of communicating device can be installed in the second section 72 as the above wireless module 5. The buckling mechanism, including the recesses and protrusions, makes it easy to change different wireless modules, without the need of changing designs. Any type of battery can be installed in the first section 71 since the battery module 4 has two symmetric sliding slots on two sides. Further, even for a large sized battery, since the first section 71 communicates with the opening 79 of the lower shell 7, a portion of the large sized battery is exposed by the housing. Moreover, by moving the switch 78 on the back of the jacket, the movable wedge 77 is easily shifted and disengaged from a buckling status, thereby changing the battery module.

Since the main circuit board module 6 is mounted in the third section 73 of the lower shell 7 through a plurality of screws, when an additional electronic device is needed or when an electronic device is to be deleted, the main circuit board module can be changed without changing the design of other parts. Since the upper shell 3 joins with the lower shell 7 by a buckling means (or some screws), the disassembly is convenient for changing the above wireless module 5 and the main circuit board module 6.

Since the adapter connector 22 of the adapting board 2 is electrically connected to the adapter connector 61, the adapting board 2 can be directly changed even though there is a height difference between the left and right sides, as shown in FIG. 8. There is no need to change the design of other parts. In case different buttons are required to meet a customer's requirements or to fit a new model of PDA, only the adapting board 2 and corresponding cover body 1 are replaced. This solves the biggest problem of making the universal modularized jacket: different manufacturers and different models use different connectors and placements.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A modularized universal jacket for a personal digital assistant (PDA), comprising:
    a housing consisting of an upper shell and a lower shell for enclosing to define a first section, a second section and a third section in an interior space thereof, the upper shell of the housing includes a seesawing plate having a support needle at an end thereof, and the support needle corresponds to a reset hole of the PDA;
    a module set mounted in at least one of the three sections and electrically connected to each other; and
    adapting means coupled on the housing;
    wherein each of the modules is replaced according to instructions, or predetermined or upgrade needs.

2. The modularized universal jacket of claim 1, wherein the module set includes a battery module.

3. The modularized universal jacket of claim 1, wherein the module set includes a wireless module.

4. The modularized universal jacket of claim 1, wherein the module set includes a main circuit board module.

5. The modularized universal jacket of claim 1, wherein the module set has an adapter connector thereon, and the adapting means includes an adapting board having an adapter connector electrically connected to the adapter connector of the module set and a receptacle connector electrically connected to the FDA.

6. The modularized universal jacket of claim 5, wherein the adapting means further includes a cover body covered on the adapting board, and the cover body has buttons corresponding to electronic components on the adapting board, wherein the adapting board further includes a power socket and a jack.

7. The modularized universal jacket of claim 1, wherein the lower shell of the housing includes a card connector for inserting an electronic card therein.

8. The modularized universal jacket of claim 1, wherein the first section of the housing has an opening at an outer end thereof.

9. The modularized universal jacket of claim 2, wherein the first section of the housing has two guiding tracks at two sides thereof, and the battery module mounted in the first section includes two sliding slots in correspondence with the guiding tracks of the first section.

10. The modularized universal jacket of claim 9, wherein the first section of the housing has a movable wedge at an inner end thereof, and the battery module has an recess in which the movable wedge is buckled, wherein the movable wedge is connected to a switch assembled on an exterior surface of the housing.

11. The modularized universal jacket of claim 3, wherein the second section of the housing has a protrusion and a recess distributed on a periphery thereof, and the wireless module mounted in the second section includes a recess and a protrusion in correspondence with the protrusion and the recess of the second section.

12. The modularized universal jacket of claim 4, wherein the main circuit board module mounted in the third section by means of screws includes an adapter connector exposed by the upper shell of the housing.

13. The modularized universal jacket of claim 12, wherein the adapting means includes an adapting board having an adapter connector electrically connected to the adapter connector of the main circuit board module and a receptacle connector electrically connected to the PDA.

14. A modularized universal jacket for a personal digital assistant (PDA), comprising:

a housing consisting of an upper shell and a lower shell for enclosing to define a first section, a second section and a third section in an interior space thereof, and the first section has a movable wedge at an inner end thereof;

a module set having a the battery module mounted in at least one of the three sections, and the battery module having an recess in which the movable wedge is buckled, wherein the movable wedge is connected to a switch assembled on an exterior surface of the housing; and adapting means coupled on the housing;

wherein each of the modules is replaced according to instructions, or predetermined or upgrade needs.

* * * * *